H. Rensch.
Beer Cooler.
Nº 60,059.      Patented Nov. 27, 1866.
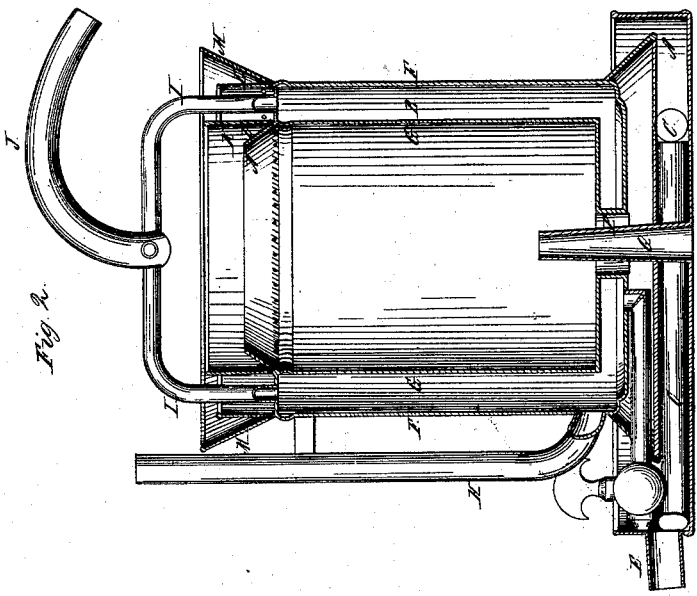
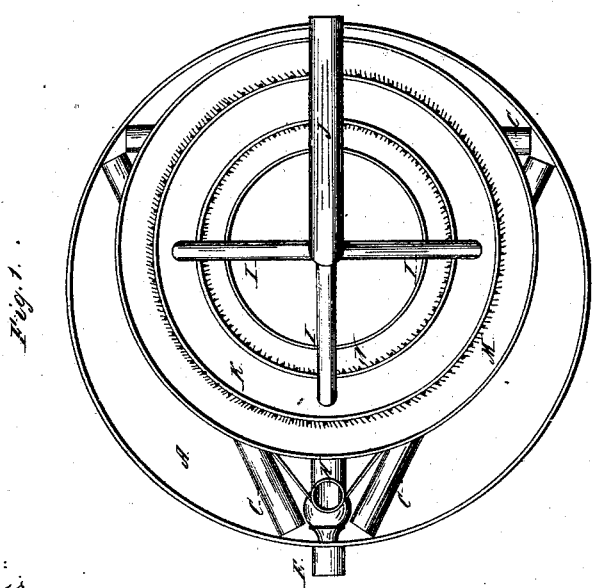
Witnesses:
J. E. Dennis
Chas. Hadaway
Inventor:
Henry Rensch
By his Attorney J. Dennis Jr.

United States Patent Office.

IMPROVED APPARATUS FOR COOLING BEER.

HENRY RENSCH, OF QUINCY, ILLINOIS.

Letters Patent No. 60,059, dated November 27, 1866.

SPECIFICATION.

TO ALL WHOM IT MAY CONCERN:

Be it known that I, HENRY RENSCH, of Quincy, Adams county, State of Illinois, have invented certain new and useful improvements in Apparatus for Cooling Beer and other Liquids; and I do hereby declare the following description and accompanying drawings are sufficient to enable any person skilled in the art, or science, to which it most nearly appertains, to make and use my said invention or improvements, without further invention or experiment.

The nature of my invention and improvements consists in a perpendicular cylinder with double walls supplied with cold water at the bottom, and escaping at the top, and provided with receiving and distributing troughs at the top, and an opening at the bottom for the escape of the beer running down on the inside of the cylinder. Also in a pipe to supply air and ventilate in the inside of cylinder, and carry off the steam from the liquor being cooled. In the accompanying drawings—

Figure 1 is a plan or top view of my apparatus for cooling beer or other liquids.

Figure 2 is a section of fig. 1, cut perpendicularly across the centre.

In these drawings, A is a tank or vessel made circular or otherwise to receive the cooled beer or other liquor from the cylinder B, arranged to stand on some supports, C C, in the tank, which tank has a pipe or cock, E, to draw off its contents. The cylinder, B, is made of two walls, F and G, of sheet metal, and with a double bottom as shown in fig. 2, between which walls and bottom it is supplied with cold or ice water flowing into the space between the walls, through the pipe H; entering at the bottom of the cylinder, and rising up to the top, it flows out through the pipes I I and J, and passes off after it has cooled the beer which flows down in a thin sheet on the outside and inside of the cylinder. Around the top of the cylinder, I make a trough, K, about the same width as the space between the walls of the cylinder. The sides of the trough K are perforated, as shown at L L, for the beer, which flows into the trough hot, to flow out against the guiding rims M and N, the bottom edges of which rims or flanges, are slit a little in from the edge, and the metal bent so as to filter or make the beer trickle or run down in thin sheets on the sides of the cylinder; the guide rims being inclined with their lower edges against the cylinder as shown in fig. 2. The beer, in passing down the sides of the cold cylinder, is cooled, and is caught in the tank A, under the cylinder. There is an opening, P, in the bottom of the cylinder for the beer which runs down on the inside of the cylinder to run out into the tank. In order to carry the steam off from the inside of the cylinder, I put a pipe, Q, up through the bottom of the tank and let it project up through the opening P, so as to supply air to the interior of the cylinder, and give it free ventilation. To draw the water from the cylinder, I put a pipe, R, in the bottom, with a cock, S, to draw all the water out when required.

I claim as my improvement a perpendicular cylinder with double walls supplied with cold or ice water at the bottom, and escaping at the top, in combination with the receiving and distributing troughs at the top, and opening in the bottom of the cylinder for the escape of the beer running down on the inside of the cylinder.

And in combination with the cylinder above claimed, I claim the pipe Q, or its equivalent for supplying air to the interior of the cylinder near the bottom to carry off the steam or evaporation from the liquid being cooled.

I also claim the construction and arrangement of the guiding rims M and N, or flanges, for the purpose set forth.

HENRY RENSCH.

Witnesses:
W. G. EWING,
GEORGE ERNST.